Jan. 18, 1966   J. B. ERIKSEN   3,229,326
ARRANGEMENT FOR FEEDING OF FISH
Filed Nov. 13, 1963

INVENTOR
JAN BERGH ERIKSEN

BY Irvin S. Thompson
ATTORNEY

United States Patent Office 3,229,326
Patented Jan. 18, 1966

3,229,326
ARRANGEMENT FOR FEEDING OF FISH
Jan Bergh Eriksen, Stavanger, Norway, assignor to Trio Fabrikker A/S de Forenede Norske Laase-Og Beslagfabriker, Stavanger, Norway
Filed Nov. 13, 1963, Ser. No. 323,366
7 Claims. (Cl. 17—2)

The present invention relates to methods and apparatus for conveying and orienting fish.

According to the present invention, there is provided a method of conveying and orienting fish, in which fish are fed to a vibratory conveyor, and are removed from opposite ends of the conveyor, and those fish from one end of the conveyor are turned end-for-end so that all the fish are similarly oriented with their heads pointing in the same direction. Also, the thus-oriented fish are moved lengthwise along an elongated trough whose sides are of progressively steeper pitch in the direction of movement of the fish, with the fish in contact with both sides of the trough so that all the fish become similarly oriented with their backs down.

The apparatus for carrying out the invention comprises a vibratory conveyor having a deck, means for feeding fish to the deck intermediate the ends of the deck, and conveyor means for turning fish discharged from one end of the deck end-for-end and for recombining the latter fish with fish discharged from the other end of the deck. Preferably, the vibratory conveyor has a pair of vertically displaced decks interconnected by chute means that make a turn of 180° during passage of material from the upper deck to the lower deck. The apparatus also includes a trough positioned to receive fish from the discharge end of the vibratory conveyor, the trough having side walls of progresively steeper pitch in a direction away from the vibratory conveyor. Also, preferably, the bottom of the trough is downwardly inclined in a direction away from the vibratory conveyor, and means are provided that mount the vibratory conveyor and the trough in unitary assembly with each other for conjoint vibration the one with the other.

An embodiment of the invention is disclosed, by way of example, in the following description and in the accompanying drawing, in which.

Figure 1:
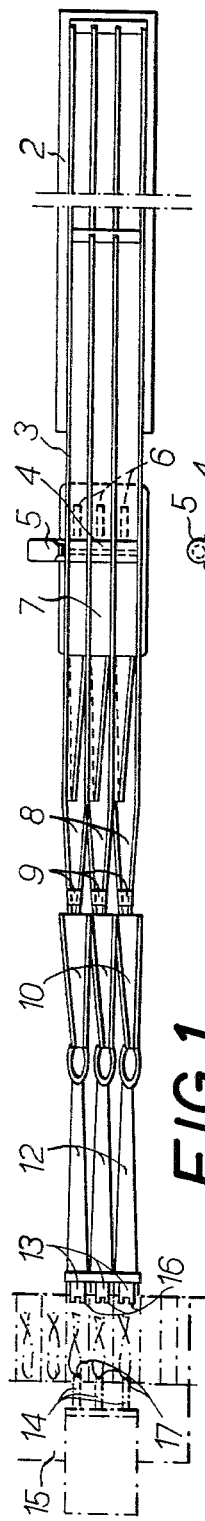
FIGURE 1 is a plan view of apparatus according to the present invention.
Figure 2:
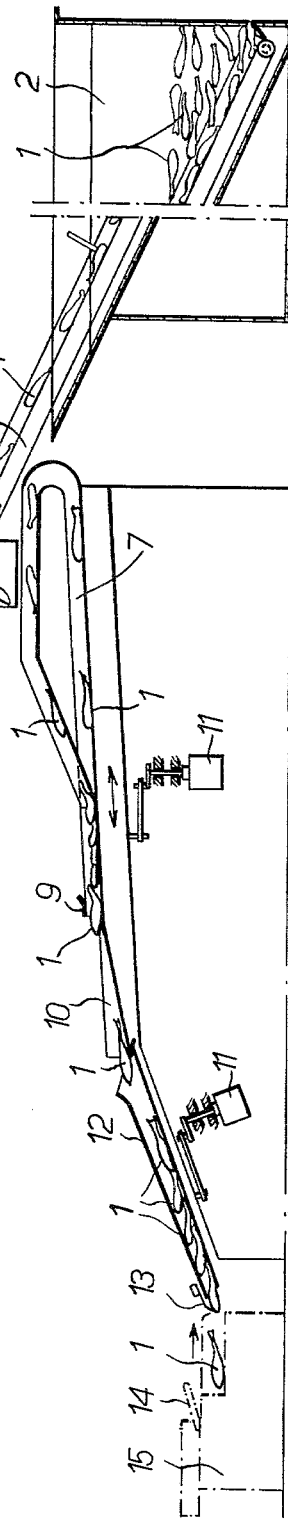
FIGURE 2 is a side elevational view, partially in section, of the device of FIG. 1.
Figure 3:
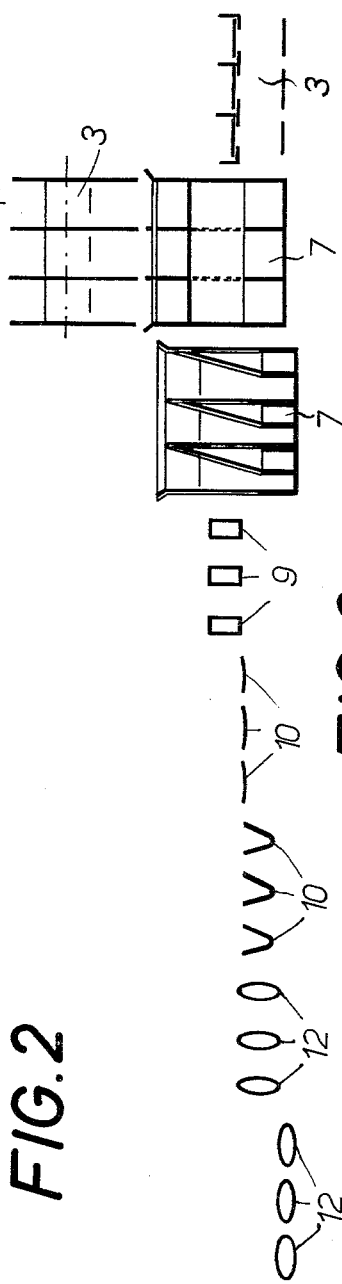
FIGURE 3 shows a series of cross-sectional views of the apparatus, each of which is in vertical alignment with its corresponding portion of the apparatus shown in FIGS. 1 and 2.

The embodiment shown in the drawing comprises a conveying and orienting device for fish, which has three parallel paths. The fish 1 are supplied to a container 2 filled with water. From the bottom of the container, the fish are transported by means of a belt conveyor 3, 4, comprising three members driven by a common motor 5. The drive to each of those three members may be interrupted by means of an arresting device 6.

From the belt conveyor, fish fall downwardly with their heads directed in one or the other direction, onto an orienting device 7. The device 7 comprises a vibrator 11 for device 7, and the vibratory motion imparted to device 7 by device 11 ensures that the fish are delivered head first to troughs 8 having a restricted portion 9 each of which is provided with a feeler which, through a counting device or the like, controls the arresting device 6.

The vibratory motion causes the fish to be conveyed to a device 10, which due to the cross-sectional shape of its trays will turn the fish edgewise with their backs facing downwardly. Thereafter, the fish are turned to the desired side within discharge tubes 12 that are moved by another vibratory device 11. The tubes 12 incline downwardly toward a fish treatment machine 15, and the discharge end of each tube is restricted by a spring 13 the free end of which is provided with a slot 16 which extends longitudinally of the tubes and is open at its end.

Associated with the fish treatment machine 15 is a plurality of arms 14 corresponding in number to the tubes 12. Each arm 14 has a prong 17 on its outer end. The arms are movable toward the tubes so that the prongs 17 extend through slots 16 in spring 13 to engage with a fish in the associated tube and to pull the fish past the restriction provided by the associated spring 13, whereupon the fish are pulled into the fish treatment machine.

I claim:

1. A method of conveying and orienting fish, comprising feeding fish to a vibratory conveyor, removing fish from opposite ends of the conveyor, and turning the fish from one end of the conveyor end for end, whereby all the fish are similarly oriented with their heads pointing in the same direction.

2. A method of conveying and orienting fish, comprising feeding fish to a vibratory conveyor, removing fish from opposite ends of the conveyor, turning the fish from one end of the conveyor end for end so that all the fish are similary oriented with their heads pointing in the same direction, then moving the thus-oriented fish lengthwise along an elongated trough whose side walls are of progressively steeper pitch in the direction of movement of the fish, with the fish in contact with both side walls of the trough so that all the fish become similarly oriented with their backs down.

3. Apparatus for conveying and orienting fish, comprising a vibratory conveyor having a deck, means for feeding fish to the deck intermediate the ends of the deck, and conveyor means for turning fish discharged from one end of the deck end for end and for recombining the latter fish with fish discharged from the other end of the deck.

4. Apparatus for conveying and orienting fish, comprising a vibratory conveyor having a pair of vertically displaced decks interconnected by chute means that make a turn of 180° during passage of material from the upper deck to the lower deck, means for vibrating the vibratory conveyor, and means for feeding fish to a portion of the upper deck inermediate the ends of the upper deck.

5. Apparatus for conveying and orienting fish, comprising a vibratory conveyor having a pair of vertically displaced decks interconnected by chute means that make a turn of 180° during passage of material from the upper deck to the lower deck, means for vibrating the vibratory conveyor, means for feeding fish to a portion of the upper deck intermediate the ends of the upper deck, and a trough positioned to receive fish from the discharge end of the vibratory conveyor, the through having side walls of progressively steeper pitch in a direction away from the vibratory conveyor.

6. Apparatus as claimed in claim 5, the bottom of the trough being downwardly inclined in a direction away from the vibratory conveyor.

7. Apparatus as claimed in claim 5, and means mounting the vibratory conveyor and the trough in unitary assembly for conjoint vibration the one with the other.

References Cited by the Examiner

UNITED STATES PATENTS

| | | | |
|---|---|---|---|
| 953,398 | 3/1910 | Rogers. | |
| 1,373,812 | 4/1921 | Heath | 17—2 |
| 1,689,919 | 10/1928 | Heath | 17—2 |
| 1,893,903 | 1/1933 | Mullins | 17—2 |
| 1,967,228 | 7/1934 | Drevitson | 17—2 |
| 2,672,647 | 3/1954 | Haber | 17—2 |
| 2,680,876 | 6/1954 | Oates | 17—2 |
| 3,104,756 | 9/1963 | Walker | 17—2 XR |

FOREIGN PATENTS

| | | |
|---|---|---|
| 92,809 | 2/1962 | Denmark. |
| 27,480 | 12/1916 | Norway. |
| 28,200 | 9/1917 | Norway. |

SAMUEL KOREN, *Primary Examiner.*

LUCIE H. LAUDENSLAGER, *Examiner.*